United States Patent
Lee

(10) Patent No.: US 6,204,660 B1
(45) Date of Patent: Mar. 20, 2001

(54) METHOD OF VARYING CAPACITY OF HEAD DISK DRIVE DURING MANUFACTURING PROCESS BY CHECKING HEAD/DISK COMBINATIONS FOR DEFECTS

(75) Inventor: Jae-Sung Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/089,737

(22) Filed: Jun. 3, 1998

(30) Foreign Application Priority Data

Jun. 3, 1997 (KR) .................................. 97-22828

(51) Int. Cl.⁷ ............................. G01R 33/12; G11B 27/36
(52) U.S. Cl. ................................ 324/212; 360/31; 369/58
(58) Field of Search ..................... 324/210, 211, 324/212; 369/53, 58; 360/31; 29/593

(56) References Cited

U.S. PATENT DOCUMENTS

| | | |
|---|---|---|
| 2,937,368 | * 5/1960 | Newby .................................. 324/212 |
| 4,949,036 | 8/1990 | Bezinque et al. . |
| 5,132,956 | 7/1992 | Ichikawa . |
| 5,212,677 | 5/1993 | Shimote et al. . |
| 5,216,655 | 6/1993 | Hearn et al. . |
| 5,253,256 | 10/1993 | Oyama et al. . |
| 5,280,395 | 1/1994 | Matsuzaki . |
| 5,442,638 | 8/1995 | Awad et al. . |
| 5,537,264 | 7/1996 | Pinteric . |
| 5,568,627 | 10/1996 | Leshay et al. . |
| 5,568,696 | 10/1996 | Dobbek . |
| 5,654,841 | 8/1997 | Hobson et al. . |
| 5,657,176 | 8/1997 | Moribe et al. . |
| 5,740,358 | 4/1998 | Geldman et al. . |

* cited by examiner

Primary Examiner—Walter Snow
(74) Attorney, Agent, or Firm—Robert E. Bushnell, Esq.

(57) ABSTRACT

A method of varying the capacity of a multi-platter hard disk drive, having a plurality of head/disk combinations, during a manufacturing process includes scanning the overall disk surfaces to detect defects. If the number of defects detected on a disk surface exceeds a design specification number, the head/disk combination having the disk surface is determined to be defective. Then, the use of the defective head/disk combination is avoided, to thereby vary the capacity of the hard disk drive.

20 Claims, 4 Drawing Sheets

METHOD OF VARYING CAPACITY OF HEAD DISK DRIVE DURING MANUFACTURING PROCESS BY CHECKING HEAD/DISK COMBINATIONS FOR DEFECTS

CLAIM OF PRIORITY

This application makes reference to, incorporates the same herein, and claims all benefits accruing under 35 U.S.C. §119 from an application for METHOD FOR VARYING CAPACITY OF HARD DISK DRIVE DURING MANUFACTURING PROCESS earlier filed in the Korean Industrial Property Office on Jun. 3, 1997 and there duly assigned Serial No. 22828/1997.

BACKGROUND OF THE INVENTION

1. Field of the Invention

The present invention relates to a method of varying the capacity of a hard disk drive during its manufacturing process, and in particular, to a method of varying the capacity of a hard disk drive by avoiding the use of a head/disk combination which has defects generated during a manufacturing process.

2. Description of the Related Art

A hard disk drive, which is widely used as an auxiliary memory device of a computer system, generally employs a multi-platter arrangement to maximize data recording capacity and reduce its manufacturing cost. In such a multi-platter hard disk drive, a plurality of disks are installed around a rotating actuator, that is, a driving shaft of a spindle motor, usually in four or six head/disk combinations. A head/disk combination indicates a disk surface and a head positioned over the disk surface. The performance of the head/disk combinations is checked in several tests because the hard disk drive generally requires very accurate position control and high-speed data access. Thus, a drive manufacturing company brings drives to the market whose head/disk combinations finally have passed repeated tests such as defect scanning, error rate measurement, and writing and reading of various data patterns.

However, most drive failures generated during a manufacturing process derive from one or two of four or six head/disk combinations, which turn out to have a lack of head error rate margin, disk defects, or scratches. To cope with a disk failure, the drive manufacturing company takes actions including servo write, replacement of a head stack and a disk, and so on, depending on the type of the disk failure, thus increasing manufacturing costs. Further, if a hard disk drive needs rework due to a defective head/disk combination, the hard disk drive is vulnerable to damage during handling and to contamination. As a result, the hard disk drive may fail again.

The following each disclose features in common with the present invention but do not teach or suggest the specifically recited method of varying the capacity of hard disk drive during its manufacturing process in accordance with the present invention: U.S. Pat. No. 5,740,358 to Geldman et al., entitled Defect Management And Split Field Processing In Disk Storage Systems, U.S. Pat. No. 5,654,841 to Hobson et al., entitled Detection Of Mechanical Defects In A Disc Drive Using Injected Test Signals, U.S. Pat. No. 5,657,176 to Moribe et al., entitled Method And Apparatus For Optimizing The Recording And Reproducing Of Information From Magnetic Disks, U.S. Pat. No. 5,442,638 to Awad et al., entitled Apparatus And Method For Recording Over Defects In Storage Media, U.S. Pat. No. 5,537,264 to Pinteric, entitled Method For Optimally Selecting Media Transfer Rates For Different Data Heads Based On Individual Data Head Performance, U.S. Pat. No. 5,132,956 to Ichikawa, entitled Optical Recording/Reproducing Apparatus In Which Defective Sectors Are Altered, U.S. Pat. No. 5,212,677 to Shimote et al., entitled Defect Inspecting Apparatus For Disc-Shaped Information Recording Media, U.S. Pat. No. 5,280,395 to Matsuzaki, entitled Hard Disc Track Defect Detecting Apparatus, U.S. Pat. No. 4,949,036 to Bezinque et al., entitled Disc Drive Error Mapping Using Threshold Comparison Methods, U.S. Pat. No. 5,253,256 to Oyama et al., entitled Array Disk Apparatus With Unsuccessful Reconstruction Indicating Function, U.S. Pat. No. 5,568,627 to Leshay et al., entitled Header Verification In A Disk Drive Using Sector Histories For Improved Format Efficiency, and U.S. Pat. No. 5,568,606 to Dobbek, entitled Method And Apparatus For Maximizing Effective Disk Capacity Using Adaptive Skewing.

SUMMARY OF THE INVENTION

An object of the present invention is to provide a method of varying the capacity of a multi-platter hard disk drive by not using one or more head/disk combinations, which turn out to be the only defective combinations, in a manufacturing process without rework such as the disassembly of the hard disk drive and replacement of parts.

To achieve the above object, there is provided a method of varying the capacity of a hard disk drive having a plurality of head/disk combinations, in which disk surfaces of all of the head/disk combinations are scanned to detect defects, a head/disk combination is determined to be defective if the number of defects detected from a disk surface of the head/disk combination in the defect scanning step exceeds a reference defect number for each head/disk combination, and the use of each defective head/disk combination is avoided.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The operation of the present invention according to an embodiment of the present invention is described below, referring to the attached drawings.

Figure 1:
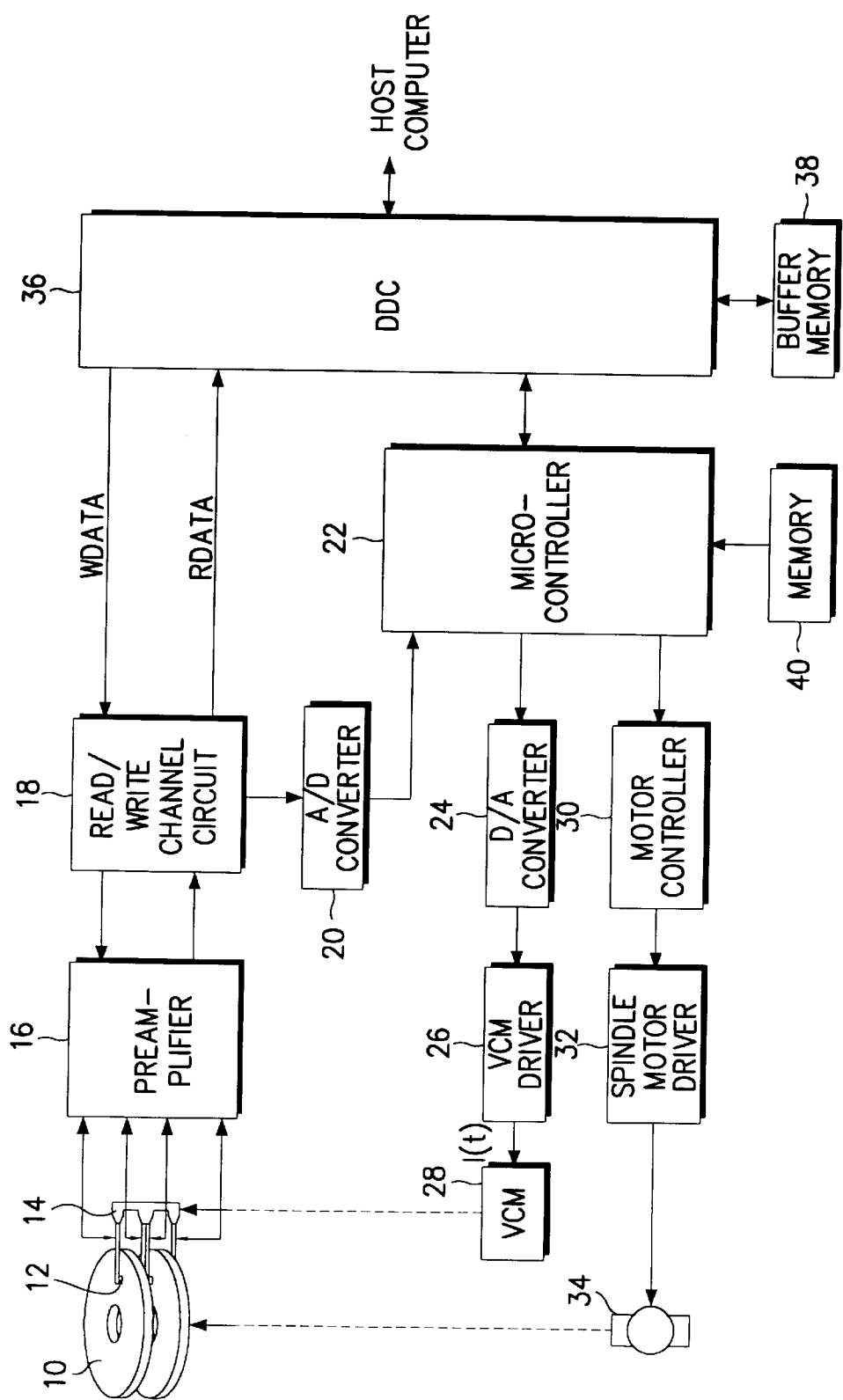
FIG. 1 is a block diagram of a hard disk drive.

FIG. 1 is a block diagram of a hard disk drive. In FIG. 1, the hard disk drive has, for example, two disks 10 and four heads 12 corresponding to the disks 10. Hence, the number of head/disk combinations is equal to that of the heads 12. Generally, the disks 10 are rotatably stacked around a driving shaft of a spindle motor 34, with each disk surface corresponding to one of the heads 12. Each of the disks 10 has a plurality of concentrically arranged tracks and includes a parking zone where a head 12 is positioned when the drive is not used, that is, power is off, and a maintenance zone where replacement information with respect to a defective sector and various data for repairing and maintaining a system are recorded. The heads 12 are positioned over the surfaces of the disks 10, and installed on arms 14 extended from an arm assembly of a rotary voice coil motor (VCM) 28.

For reading data, a preamplifier 16 preamplifies a read signal picked up by one of the heads 12 and supplies the preamplified signal to a read/write channel circuit 18. On the other hand, for writing data, the preamplifier 16 records encoded write data supplied from the read/write channel circuit 18 on a disk 10 by driving a corresponding head 12. The preamplifier 16 selects the head 12 under the control of a disk data controller (DDC) 36.

The read/write channel circuit 18 decodes the read signal supplied from the preamplifier 16, and generates read data RDATA. It also encodes write data WDATA supplied from the DDC 36 and supplies the encoded write data WDATA to the preamplifier 16. Further, the read/write channel circuit 18 demodulates head position information included in servo information recorded on the disks 10, generates a position error signal PES, and supplies the position error signal PES to an analog/digital (A/D) converter 20.

The A/D converter 20 converts the position error signal PES to a digital step value corresponding to its level, and sends the digital signal to a microcontroller 22.

The DDC 36 records data received from a host computer on the disks 10 through the read/write channel circuit 18 and the preamplifier 16, or sends data reproduced from the disks 10 to the host computer. The DDC 36 also interfaces communication between the host computer and the microcomputer 22.

The microcomputer 22 controls the DDC 36 in response to a data read/write command received from the host computer. It also controls track search and track following by means of the value of the position error signal PES received from the A/D converter 20, and performs a servo control in response to various servo-related signals output from a gate array (not shown). The microcontroller 22 performs a series of control operations to avoid the use of a defective head/disk combination according to embodiments of the present invention.

A digital/analog (D/A) converter 24 converts a control value generated by the microcontroller 22, for controlling the positions of the heads 12, to an analog signal, and outputs the analog signal to a VCM driver 26.

The VCM driver 26 generates a current I(t) for driving an actuator by means of the signal supplied from the D/A converter 24, and supplies the current I(t) to the VCM 28.

The VCM 28, positioned on one side of the actuator having the heads 12 attached to the other side thereof, moves the heads 12 horizontally over the disks 10 according to the direction and level of the current I(t) received from the VCM driver 26.

A motor controller 30 controls a spindle motor driver 32 according to control values generated by the microcontroller 22, for controlling the rotation of the disks 10.

The spindle motor driver 32 rotates the disks 10 by driving a spindle motor 34 under the control of the motor controller 30.

A buffer memory 38 connected to the DDC 36 temporarily stores data transmitted between the host computer and the disks 10, and a memory 40 connected to the micro computer 22 includes a ROM having a control program according to the embodiments of the present invention, and a flash memory.

Meanwhile, a method of detecting a defective head/disk combination is performed in two ways according to embodiments of the present invention: (1) if the number of defects detected during a defect scanning stage is larger than a reference defect number set in designing a drive, a corresponding head/disk combination is determined to be defective. The defect scanning includes servo defect scanning and data defect scanning; and (2) head performance is estimated by measuring the error rate of each head/disk combination, and if the error rate is higher than a reference error rate set in designing the drive, a corresponding head/disk combination is determined to be defective.

The defective head/disk combination detecting method will be described referring to FIGS. 2 and 3.

Figure 2:
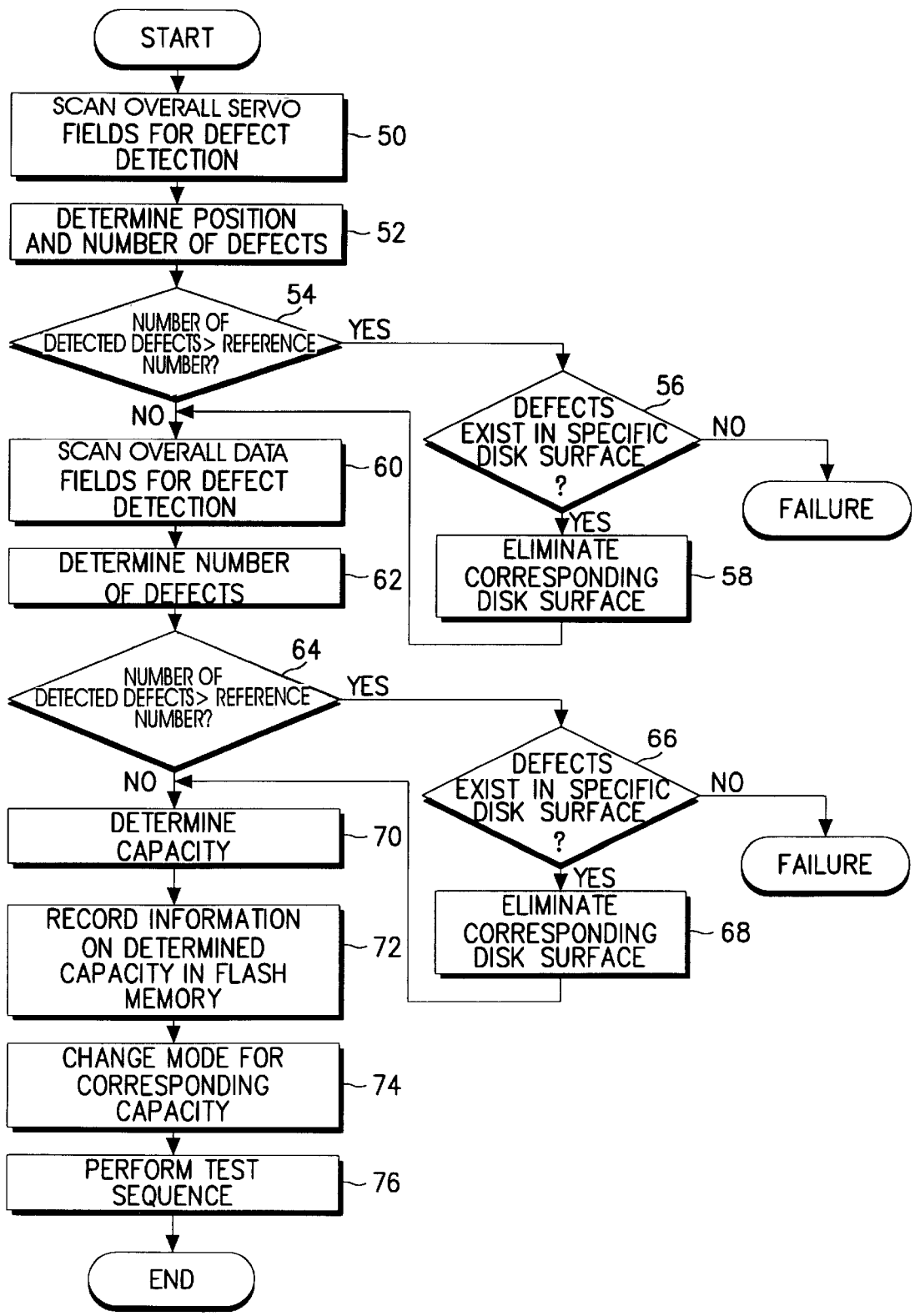
FIG. 2 is a flowchart of a process for detecting a defective head/disk combination according to an embodiment of the present invention.
Figure 3A:
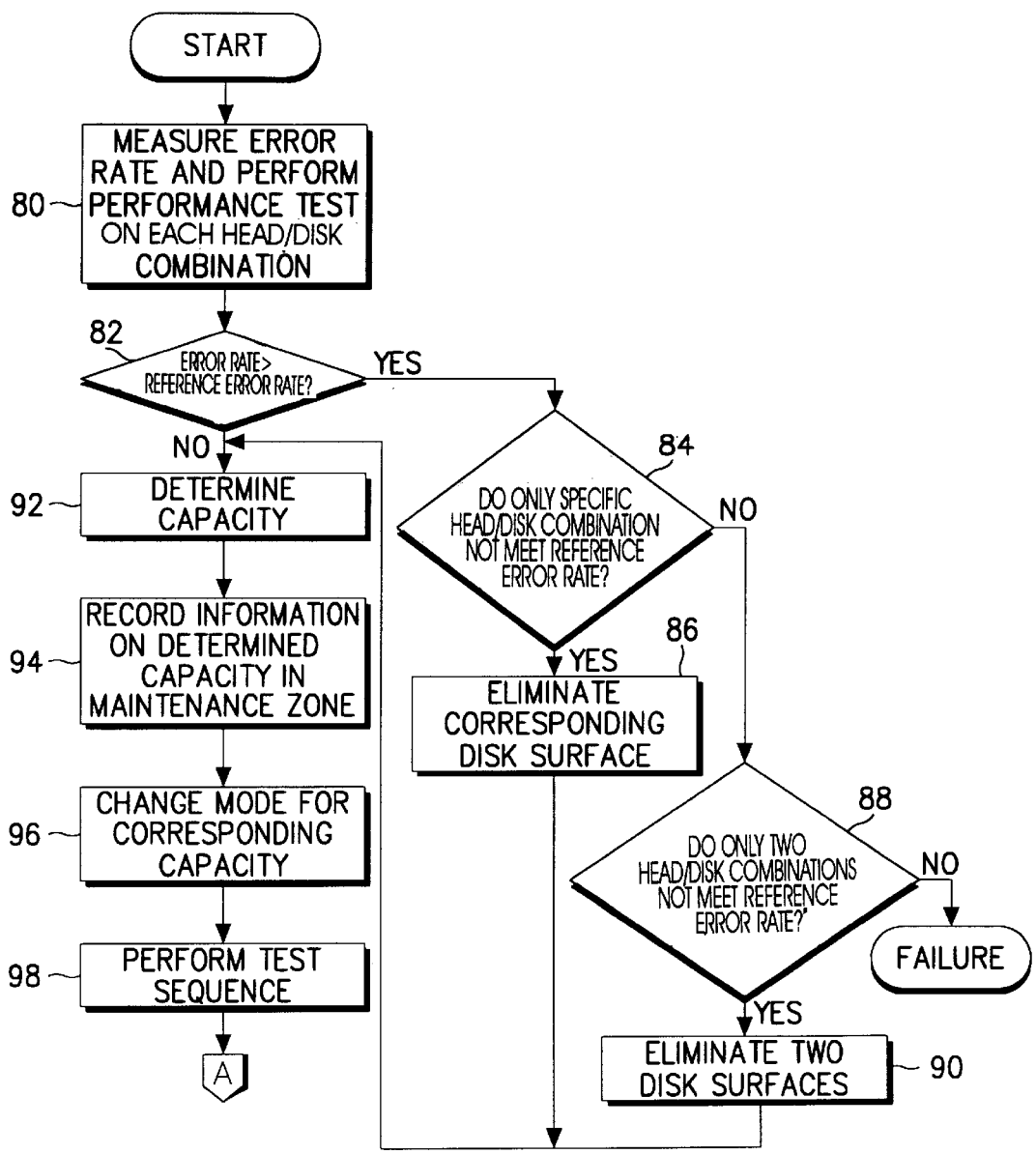
FIGS. 3A and 3B together form a flowchart of a process for detecting a defective head/disk combination according to another embodiment of the present invention.
Figure 3B:
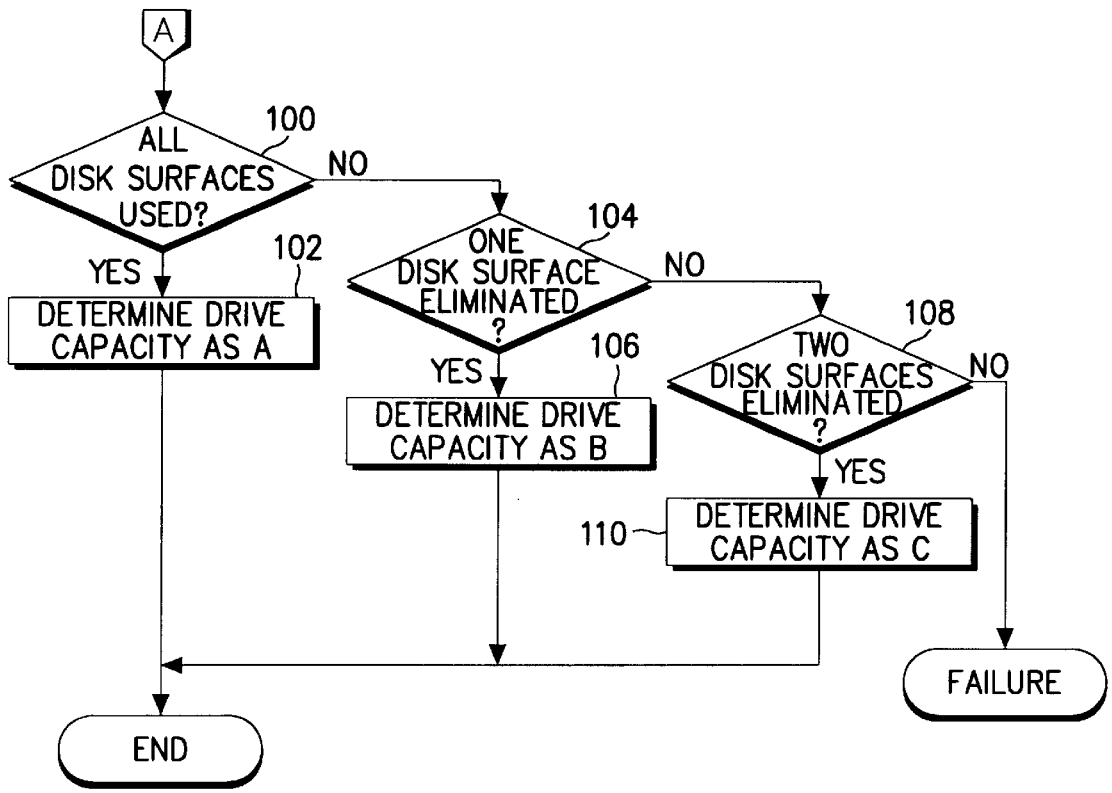

FIG. 2 is a flowchart of a process for detecting a defective head/disk combination through defect scanning according to an embodiment of the present invention. FIGS. 3A and 3B together form a flowchart of a process for detecting a defective head/disk combination by measuring the error rate of each head/disk combination according to another embodiment of the present invention. The two embodiments are the same, except for the conditions used for determining a defective head/disk combination.

Referring to FIG. 2, the microcontroller 22 scans the overall servo fields of a drive to detect defects, in step 50. A servo address mark, index, gray code, and servo burst areas in a servo field are subjected to the defect scanning. For defect scanning of the servo fields, the microcontroller 22 determines the positions and number of defects in each head/disk combination, in step 52. In step 54, the microcontroller 22 determines whether the number of detected defects in each head/disk combination exceeds a reference defect number set in an early stage of designing the drive. If the number of defects detected in each head/disk combination is the reference defect number or smaller, the servo field defect scanning is terminated, and the procedure jumps to step 60. On the other hand, if the number of the defects detected in each head/disk combination is larger than the reference defect number, the microcontroller 22 determines whether the defects exist only on a specific disk surface, in step 56. If the defects turn out to be confined to the specific disk surface, the microcontroller 22 eliminates the corresponding disk surface from usage, that is, a corresponding head/disk combination, in step 58, as shown in FIG. 2. Then, the procedure goes to step 60. However, if during step 56 a determination establishes that each of a plurality of disk surfaces has more defects than the reference defect number, the drive is determined to be a failure. Here, the plural number is a number that cannot satisfy a is minimum capacity for a drive, and can be varied according to drives. The head/disk combination use elimination step includes recording a defective head/disk combination number in the maintenance zone of a disk 10 or in a flash memory, and modifying already detected servo defect map information.

Meanwhile, after the servo field defect detection stage is over, the microcontroller 22 performs a data field defect scan. In step 60, the microcontroller 22 scans the overall data fields to detect defects. For data field scanning, the microcontroller 22 determines the positions and number of defects in each head/disk combination, in step 62. In step 64, the microcontroller 22 determines whether the number of defects detected in each head/disk combination exceeds a reference defect number set in designing the drive. If the number of defects detected in each head/disk combination is the reference defect number or smaller, the data field scanning is terminated, and the procedure jumps to step 70. On the other hand, if the number of defects detected in each head/disk combination is larger than the reference defect number, the microcontroller 22 determines whether the defects exist only on a specific disk surface, in step 66. If the defects turns out to be confined to the data field of the specific disk surface, the microcontroller 22 eliminates from usage the corresponding disk surface, that is, a corresponding head/disk combination, in step 68, as shown in FIG. 2, and the procedure goes to step 70. If the defects are generated on the plurality of disk surfaces, the drive is determined to be a failure as in the servo field scanning stage.

After the servo field scanning and the data field scanning, the microcontroller 22 checks the number of the eliminated head/disk combinations and then finally determines the capacity of the drive, in step 70. According to the determined capacity, firmware can be replaced, or different pieces of zone-related information and physical head number information are preliminarily prepared in a single fin-ware in order to be selectively used. The microcontroller 22 records information on the determined capacity in a flash memory or a maintenance zone, in step 72, and changes a mode according to the determined capacity, in step 74, if a single firmware operates for all variable capacities of a drive. However, if any additional firmware is needed for the determined capacity, firmware must be changed. In step 76, the microcontroller 22 performs a test sequence and then terminates the defective head/disk combination detection procedure through defect scanning according to the first embodiment of the present invention. A capacity label or a bar code is attached to the drive from which defective head/disk combinations have been eliminated from usage during the defect scanning process, according to the number of the eliminated head/disk combinations. Then, the drive is subjected to subsequent processes.

Referring to FIGS. 3A and 3B showing a process for detecting a defective head/disk combination through error rate measurement, the microcontroller 22 measures an error rate of each head/disk combination and performs a performance test on each head/disk combination, in step 80. The microcontroller 22 determines whether the error rate of each head exceeds a reference error rate set in an early designing stage, in step 82. If the error rate of each head is larger than the reference error rate, the microcontroller 22 determines a corresponding capacity of a drive, in step 92. Otherwise, the microcontroller 22 determines whether only a specific head/disk combination does not meet the reference error rate, in step 84. If only the specific head/disk combination does not meet the reference error rate, the microcontroller 22 eliminates from usage only a corresponding disk surface, in step 86, and the procedure jumps to step 92. In steps 88 and 90, if two head/disk combinations do not meet the reference error rate, two corresponding disk surfaces are eliminated from usage, and if three or more head/disk combinations do not meet the reference error rate, the drive is determined to be a failure. Then, in step 92, the microcontroller 22 checks the numbers of eliminated head/disk combinations, and finally determines the capacity of the drive. The microcontroller 22 records information on the determined capacity in a flash memory or a maintenance zone, in step 94, changes a mode according to the determined capacity, in step 96, and performs a test sequence, in step 98.

Subsequently, the microcontroller 22 determines whether the overall disk surfaces were used, in step 100. If they were, the capacity of the drive is set to capacity A, in step 102. If they were not all used, the microcontroller 22 determines whether one disk surface was eliminated, in step 104. If it was, the capacity of the drive is set to capacity B, in step 106. Here, capacity A is larger than capacity B. If at least one disk surface turns out to be eliminated in step 104, the microcontroller 22 determines whether two disk surfaces were eliminated, in step 108. If they were, the capacity of the drive is set to capacity C smaller than capacity B, in step 110. If three or more disk surfaces were eliminated in step 108, the drive is determined to be a failure. Then, the defective head/disk combination detection according to the second embodiment of the present invention is terminated.

A capacity label or a bar code is attached to the drive from which a defective head/disk combination is eliminated from usage during the performance test. Then, the drive is subjected to subsequent processes. As a result, the need for rework of the defective drive is unnecessary, thus preventing manufacturing process losses.

According to the present invention as described above, since whether a drive is defective or not can be determined during its manufacturing process without interrupting the process stream, the capacity of the drive can be changed without replacement of additional parts or addition of processes, thereby decreasing manufacturing cost and increasing product yield.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of varying the capacity of a hard disk drive, having a plurality of head/disk combinations, during a manufacturing process, comprising the steps of:

scanning disk surfaces of all of the head/disk combinations to detect defects;

determining a head/disk combination to be defective if the number of defects detected from a disk surface of the head/disk combination in the defect scanning step exceeds a reference defect number for each head/disk combination; and eliminating from usage each defective head/disk combination.

2. A method of varying the capacity of a hard disk drive during a manufacturing process as claimed in claim 1, the defect scanning step comprising scanning both servo and data fields of the disk surfaces.

3. A method of varying the capacity of a hard disk drive during a manufacturing process as claimed in claim 1, information on each defective head/disk combination being recorded on one of a maintenance zone of a disk surface and a flash read only memory.

4. A method of varying the capacity of a hard disk drive, having a plurality of head/disk combinations, during a manufacturing process, comprising the steps of:

performing a performance test on each of the head/disk combinations;

determining a head/disk combination to be defective if the performance test result of the head/disk combination is smaller than a reference performance value; and eliminating from usage each defective head/disk combination.

5. A method of varying the capacity of a hard disk drive during a manufacturing process as claimed in claim 4, the performance test comprising at least one of an error rate test, a track squeeze test, and an off-track margin test.

6. A method of varying the capacity of a hard disk drive, having a plurality of head/disk combinations, during a manufacturing process, comprising the steps of:

scanning, servo fields of disk surfaces of all of the head/disk combinations to detect defects;

determining position and number of servo defects of each head/disk combination;

determining whether the number of detected servo defects is greater than a predetermined servo defect reference number;

upon the number of detected servo defects being greater than the servo defect reference number, determining if the defects exist only in a specific disk surface and if not, determining the hard disk drive to be totally defective and if so, eliminating the head/disk combinations having the defective disk surface from usage;

scanning data fields of disk surfaces of all of the head/disk combinations to detect scan defects;

determining the number of scan defects;

determining whether the number of detected scan defects is greater than a predetermined scan defect reference number;

upon the number of detected scan defects being greater than the scan defect reference number, determining whether the scan defects exist in a specific disk surface and if not, determining the hard disk drive to be totally defective and if so, eliminating from usage the head/disk combination having the defective disk surface;

determining the overall capacity of the hard disk drive; and recording information on the determined capacity in one of a maintenance zone of a disk surface and a flash read only memory.

7. A method of varying the capacity of a hard disk drive, having a plurality of head/disk combinations, during a manufacturing process, comprising the steps of:

measuring error rate and performing performance tests on each head/disk combination;

determining if the error rate is greater than a predetermined reference error rate;

upon the error rate being determined to be greater than the reference error rate, determining whether only a specific head/disk combination has failed to meet the reference error rate and if so eliminating from usage each head/disk combination corresponding to the defective disk surface and if not, determining whether only two head/disk combinations fail to meet the reference error rate and if not, determining the hard disk drive to be totally defective and if so, eliminating from usage the two head/disk combinations corresponding to the two defective disk surfaces;

determining the capacity of the hard disk drive;

recording information on the determined capacity in one of a maintenance zone of a disk surface and a flash read only memory;

changing a mode for a corresponding capacity upon determining that a mode must be changed for the determined capacity;

performing a test sequence; and determining if all disk surfaces have been used and if so, determining the drive capacity to be a first predetermined value, and if not, determining if one head/disk combination has been eliminated from usage and if so, determining the hard disk drive capacity to be a second predetermined value and if not, determining if two head/disk combinations have been eliminating from usage and if so, determining the hard disk drive capacity to be a third predetermined value and if not, determining the hard disk drive to be totally defective.

8. A method of varying the capacity of a hard disk drive during a manufacturing process as claimed in claim 7, the performance test comprising at least one of an error rate test, a track squeeze test, and an off-track margin test.

9. A hard disk drive, comprising:

a memory comprising a plurality of disks each exhibiting a plurality of major surfaces, a plurality of tracks and a maintenance zone;

a plurality of heads with each of said heads disposed to selectively read information from different corresponding ones of said surfaces, with corresponding ones of said heads and major surfaces forming a multiplicity of pairs of head and major surface combinations;

a plurality of arms movably supporting said heads to seek and follow said tracks on said surfaces;

a read channel circuit generating position error signals in response to servo information read by said heads from disks; and a controller testing each of said of said plurality of disks, making a first determination of whether each of said plurality of disks meets a reference standard, making a second determination whenever said first determination indicates a failure by any of said surfaces of any of said plurality of disks to meet said reference standard, of whether said failure is attributable to a single one of said major surfaces, when said second determination establishes that said failure is attributable to a single one of said major surfaces, varying capacity of said memory by initiating an elimination of said single one of said major surfaces and a corresponding one of said plurality of heads from use, and determining capacity of said memory in dependence upon elimination.

10. The hard disk drive of claim 9, with said controller further comprised of scanning both servo and data fields of each of said surfaces.

11. The hard disk drive of claim 9, with said controller further comprised of recording information about said capacity on one of said maintenance zone and a flash memory.

12. The hard disk drive of claim 9, with said controller further comprised of performing said testing by making a test of one of an error rate test, a tack squeeze test and an off-track markgin test of each of said surfaces.

13. A hard disk drive, comprising:

a memory comprising a plurality of disks each exhibiting a plurality of major surfaces, a plurality of tracks and a maintenance zone;

a plurality of heads with each of said heads disposed to selectively read data from different corresponding ones of said surfaces, with corresponding ones of said heads and major surfaces forming a multiplicity of pairs of said heads and corresponding said major surfaces;

a plurality of arms movably supporting said heads to seek and follow said tracks on said surfaces;

a read channel circuit generating position error signals in response to servo information read by said heads from said disks; and a controller driven to perform testing each of said of said plurality of disks by identifying defects attributable to said memory while driving said plurality of arms to scan said plurality of heads along each of said plurality of major surfaces, making a comparison of said defects to a reference value, and in dependence upon said comparison, making an initial determination of whether said defects are attributable to a single pair of said pairs of heads and corresponding major surfaces, varying a nominal capacity of said memory by initiating an elimination of said single pair from use within said hard disk drive when said initial determination establishes that said defects are attributable to a single pair, making a subsequent determination of a resulting capacity of said memory in dependence upon said elimination, and marking said hard disk drive with information indicative of said resulting capacity.

14. The hard disk drive of claim 13, further comprised of said controller recording said information on one of said maintenance zone of said memory and a flash memory.

15. The hard disk drive of claim 13, further comprised of said controller performing said testing by:
    scanning servo fields of all of said major surfaces to identify servo defects from among said defects attributable to said memory;
    determining position and number of said servo defects within each of said servo fields for each of said pairs of heads and corresponding major surfaces;
    determining whether the number of servo defects detected within each of said servo fields is greater than a predetermined servo reference number;
    when the number of servo defects within said servo fields is determined to be greater than said servo reference number, determining whether the servo defects within the servo fields exist only in a specific major surface; and
    when said servo defects are determined to exist only in a specific major surface, performing said elimination by withdrawing said single pair including said major surface, from said use.

16. The hard disk drive of claim 13, further comprised of said controller performing said testing by:
    scanning data fields of all of said major surfaces to identify scan defects from among said defects attributable to said memory;
    determining a number of scan defects within said data field;
    determining whether said number of scan defects detected is greater than a scan defect reference number;
    when said number of scan defects detected is greater than said scan defect reference number, determining whether said scan defects occur within only a specific major surface; and
    when said scan defects are determined to occur only within a specific major surface, initiating said elimination by withdrawing from said use said single pair including said specific major surface.

17. The hard disk drive of claim 13, father comprised of said controller performing said testing by:
    scanning servo fields of all of said major surfaces to identify servo defects from among said defects attributable to said memory;
    determining position and number of said servo defects within each of said servo fields for each of said pairs of heads and corresponding major surfaces;
    determining whether the number of servo defects detected within each of said servo fields is greater than a predetermined servo reference number;
    when the number of servo defects within said servo fields is determined to be greater than said servo reference number, determining whether the servo defects within the servo fields exist only in a specific major surface;
    when said servo defects are determined to exist only in a specific major surface, performing said elimination by withdrawing said single pair including said specific major surface, from said use;
    scanning data fields of all of said major surfaces to identify scan defects from among said defects attributable to said memory;
    determining a number of scan defects within said data field;
    determining whether said number of scan defects detected is greater than a scan defect reference number;
    when said number of scan defects detected is greater than said scan defect reference number, determining whether said scan defects occur only within a particular major surface; and
    when said scan defects are determined to occur only within a particular major surface, initiating said elimination by withdrawing from said use said single pair including said particular major surface.

18. The hard disk drive of claim 13, further comprised of said controller performing said testing by:
    measuring error rate and performing performance tests on each of said pairs;
    determining whether the error rate is greater than a reference error rate;
    when the error rate is determined to be greater than said reference error rate, determining whether a specific one of said pairs has failed to meet the reference error rate; and
    when said specific pair is determined to have failed to meet the reference error rate, performing said elimination by withdrawing said specific pair from said use.

19. The hard disk drive of claim 13, further comprised of said controller performing said testing by:
    measuring error rate and performing performance tests on each of said pairs;
    determining whether the error rate is greater than a reference error rate;
    when the error rate is determined to be greater than said reference error rate, determining whether a specific pair among said plurality of pairs has failed to meet the reference error rate;
    when said specific pair is determined to have failed to meet the reference error rate, performing said elimination by withdrawing said specific pair from said use;
    when said error rate is not attributable to only a said specific pair, determining whether only two of said pairs has failed to meet the reference error rate; and
    when only two of said pairs is determined to have failed to meet said reference error rate, initiating said elimination by withdrawing both of said two pairs from said use.

20. The hard disk drive of claim 19, further comprised of said controller performing said testing by:
    marking said hard disk drive with a first indication of capacity when none of said pairs are withdrawn from said use;
    marking said hard disk drive with a second and different indication of said resulting capacity when only a single specific pair is withdrawn from said use; and
    marking said hard disk drive with a third and different indication of said resulting capacity when only two of said pairs are withdrawn from said use.

* * * * *